(12) United States Patent
Wong et al.

(10) Patent No.: US 7,013,554 B2
(45) Date of Patent: Mar. 21, 2006

(54) WIRELESS SUSPENSION SALVAGE METHOD

(75) Inventors: Xiao Ming Wong, Dongguan (CN); Rock Feng Tao, Dongguan (CN); Wei Yang, Dongguan (CN); Di Peng, Dongguan (CN); Ming Gao Yao, Dongguan (CN)

(73) Assignee: SAE Magnetics (H.K.) Ltd., Kwai Chung (CN)

( * ) Notice: Subject to any disclaimer, the term of this patent is extended or adjusted under 35 U.S.C. 154(b) by 0 days.

(21) Appl. No.: 10/885,936

(22) Filed: Jul. 6, 2004
(Under 37 CFR 1.47)

(65) Prior Publication Data

US 2005/0050704 A1 Mar. 10, 2005

Related U.S. Application Data

(62) Division of application No. 09/883,896, filed on Jun. 18, 2001, now Pat. No. 6,757,961.

(30) Foreign Application Priority Data

Mar. 28, 2001 (CN) .................... PCT/CN01/00536

(51) Int. Cl.
*G11B 5/127* (2006.01)
(52) U.S. Cl. .............................. 29/603.02; 29/402.01; 29/402.03; 29/402.08; 29/426.1; 29/426.5
(58) Field of Classification Search ............ 29/402.01, 29/402.03, 402.04, 402.06, 402.07, 402.08, 29/402.13, 402.16, 402.18, 402.21, 426.1, 29/426.2, 426.4, 426.5, 603.02, 603.04, 603.03
See application file for complete search history.

(56) References Cited

*Primary Examiner*—David P. Bryant
*Assistant Examiner*—Jermie E. Cozart
(74) *Attorney, Agent, or Firm*—Kenyon & Kenyon

(57) ABSTRACT

The invention is a method to salvage suspensions from defective head gimbal assembly units. At present the hard disk industry is undergoing rapid product cycles. The products are being upgraded faster and faster, and the ability for sliders to meet higher density requirement becomes more urgent. Therefore, the performance of a slider becomes more sensitive to signals. As the wafer manufacturing process produces a lower yield, a suspension salvage method is developed to recycle a damaged head gimbal assembly in order to minimize material loss.

8 Claims, 4 Drawing Sheets

WIRELESS SUSPENSION SALVAGE METHOD

RELATED APPLICATIONS

This application claims priority from PCT Application Serial No. PCT/CN01/00536, filed Mar. 28, 2001, entitled "Wireless Suspension Salvage Method", which is incorporated herein by reference in its entirety. The present application also is a divisional application of U.S. application Ser. No. 09/883,896 filed Jun. 18, 2001, now U.S. Pat. No. 6,757,961, which is incorporated herein by reference in its entirety.

FIELD OF THE PATENT

The present patent relates to wireless suspension salvage technology in the hard disk industry. In particular, it relates the methods of salvaging head gimbal assembly with damaged sliders.

BACKGROUND OF THE INVENTION

This invention relates to a wireless suspension salvage methods used in a hard disk storage system or the like.

With increasing use of multimedia, Internet and therefore computers, demands for larger and faster data storage devices continue to grow, making the magnetic recording industry a dynamic and fast-growing sector. Magnetic recording through hard disks remain the most commonly used among the currently available storage devices in the market: floppy disks, magneto-optical disks and magnetic tapes.

As the size of the storage devices becomes smaller, the slider also needs to be produced with higher density. Lower assembly yields coming from the wafer manufacturers translate into economic burden to the manufacturers. In order to be more efficient and to save material loss, there is a need to develop a method to salvage suspensions, one of the main parts on a head gimbal assembly ("HGA").

A hard disk drive consists of a motor, spindle, platters, read/write heads, actuator, frame, air filter, and electronics. The heads are bonded to a metal suspension (or head arm) which is a small arm that holds the head in position above or beneath a disk. A head and a suspension combined forms a head gimbals assembly or HGA. The HGA's are stacked together into a head-stack assembly, which is propelled across the disk surface by the actuator. Since the size of a hard disk is only a few inches long, it could be imagined that the length of a head gimbals assembly is no more than a few centimeters.

Structure of the HGA

Traditionally, the suspension, or a suspension assembly, in a HGA consists of a slider, a suspension bonding pad, four gold balls, and UV epoxy. The slider is mounted on tongue of the suspension with UV epoxy, and 4 gold balls are welded on both of the slider and the suspension bonding pad by ultrasonic oscillation to ensure the electrical circuit connection between the slider and the suspension connection.

Several problems are inherent in the traditional approach:

1) Gold balls need to be bonded to the slider pad and the suspension pad to ensure electrical circuit connection at the head assembly level; consequently, it is difficult to separate slider and suspension without causing damages to the suspension.

2) Slider and suspension are bonded together using UV epoxy, causing additional difficulties in removing slider without causing damages to the suspension.

3) It is difficult to remove the residue epoxy on suspension tongue completely.

Therefore, there is a need for a novel method to salvage the suspension from a HGA with defective slider.

SUMMARY

This invention relates to methods for salvaging wireless suspensions from a damaged head gimbal assembly. The slider in a head gimbal assembly is removed by horizontal twisting or vertical lifting of a pair of metal tweezers. The UV epoxy used for bonding is removed by high temperature provided by a heat gun and/or by immersion in a solvent. The gold balls from the head gimbal assembly may be separated from the damaged slider by a vertical separation, or be removed with a horizontal cut. The gold balls, if removed, can be removed either before or after the slider is removed from the head gimbal assembly.

BRIEF DESCRIPTION OF THE DRAWINGS

Like parts in different figures are identified by like numbers

DETAILED DESCRIPTION

Figure 1:
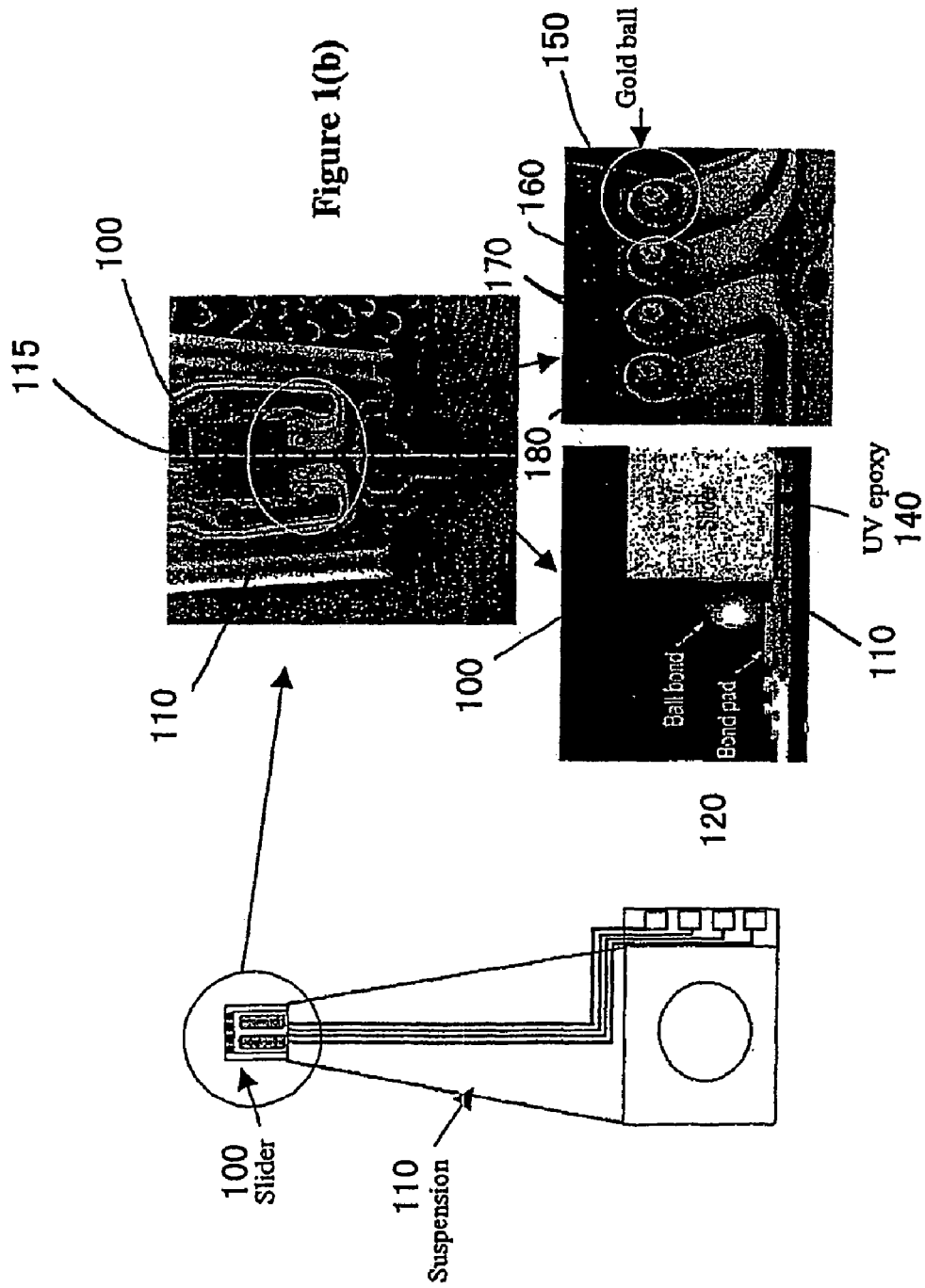
FIG. 1(a) is a top view of a sample slider attached to a suspension with electrical circuit.
FIG. 1(b) is an enlarged, prospective view of a slider.
FIG. 1(c) is an enlarged cross-sectional view of the slider of FIG. 1(b).
FIG. 1(d) is an enlarged view of the gold balls together with the bonding pads of FIG. 1(b).

Traditionally, referring to FIGS. 1(a)–1(d), a HGA assembly consists of a slider 100 attached to a suspension 110, suspension bonding pads e.g., pad 120), four gold balls 150, 160, 170, and 180, and UV epoxy 140. The slider 100 is mounted on the tongue portion of the suspension 110 using UV epoxy, and the gold balls 150–180 are welded to both slider 100 and suspension bonding pad 120 by ultrasonic oscillation to ensure the electrical circuit between slider 100 and suspension 100 remain intact.

FIG. 1(b) shows the slider portion of the HGA with enlarged details. As shown in the figure, slider 100 is mounted on tongue of suspension 110 with UV epoxy. FIG. 1(c) shows the cross sectional view cut along axis 115 of FIG. 1(b) of the bound slider 100, gold balls 150–180, suspension 110, and pads (only bonding pad 120 is shown). A layer 140 of UV epoxy is used to bond the slider 100 to suspension 110. As FIG. 1(d) shows, there are four gold balls 150, 160, 170, and 180. Each gold ball has its own bonding pad. The number of gold balls is for illustrative purpose only and are not intended to be restrictive.

Figure 2:
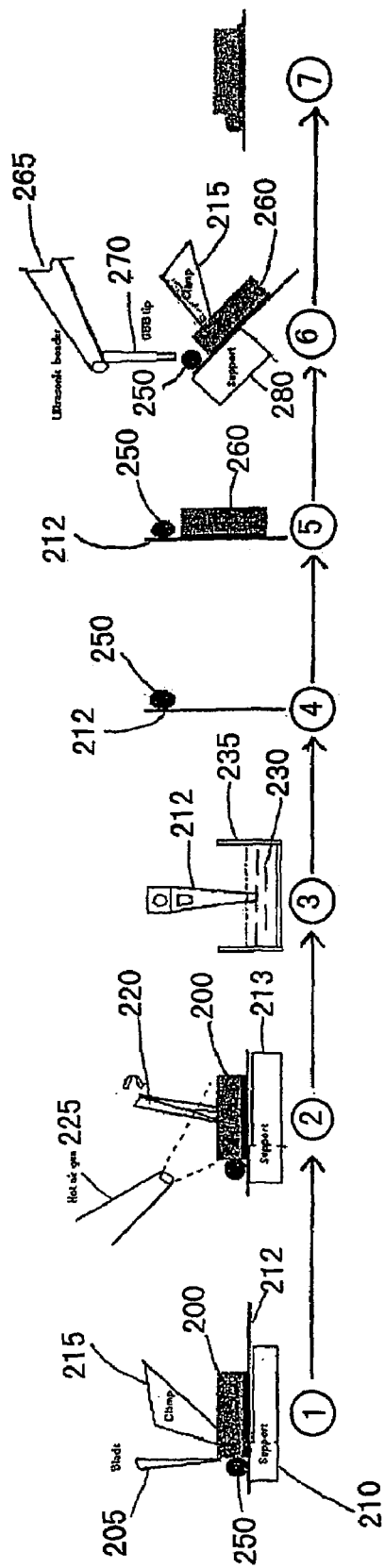
FIG. 2 is the first flow chart with descriptive drawings describing a first suspension salvage method implemented according to the principles of the present invention.

FIG. 2 illustrates a flow chart for the first suspension salvage method. This method is fit for wireless HGA without conformal coating on gold ball area. At step 1 HGA with damaged slider 200 is put on a gold ball fixture 210, or support, for cutting and is additionally fixed in position with clamp 215 to ensure the HGA will not deform while the gold ball 250 and others are being cut along the direction of slider bonding pad. The cut separates the electrical circuit connection of slider 200 and suspension 212. At step 2, the HGA is loaded on the remove slider fixture 213. A hot air gun 225, such as Hakko 851 of Hakko Corporation headquartered in Osaka, Japan, is used to heat slider area for about 5 seconds to 10 seconds at 200 to 240 degrees Celsius, which process will cause partial removal of UV epoxy. A pair of metal tweezers 220 is used to clamp slider 200 and slightly twist horizontally to remove slider 200. At step 3, the HGA with residue gold ball and UV epoxy is loaded on an immerse fixture 235 to immerse, for about 45 minutes, the tongue area of the HGA in a solvent 230 to dissolve UV epoxy. In one embodiment, the solvent is acetone. In other embodiments, the solvent is a mix solvent the formula of which is disclosed in more detail in the international application filed by the same applicant under application number PCT/CN00/00295 on Sep. 30, 2000. At step 4, the HGA is cleaned in de-ionized water mixed with approximately 0.5% to 1% of cleaner to remove the residue solvent on suspension 212. A typical cleaner is Crest 14 produced by Crest Ultrasonics of Trenton, N.J. At step 5, the salvaged suspension with original gold balls 250 and others is reprocessed. A slider 260 is mounted on the salvage suspension 212 as normal head assembly procedure. At step 6, after slider potting, the HGA is loaded on a general Gold Ball Bonding fixture 280 using the Gold Ball bond tip without gold wire to bond the four original gold balls 250 and others onto the both the slider 260 and the suspension pad for electrical circuit connection. At step 7, the reprocessed HGA will be handed off to general processing as a normal assembly product. This method retains the gold balls and only removes the damaged slider.

Figure 3:
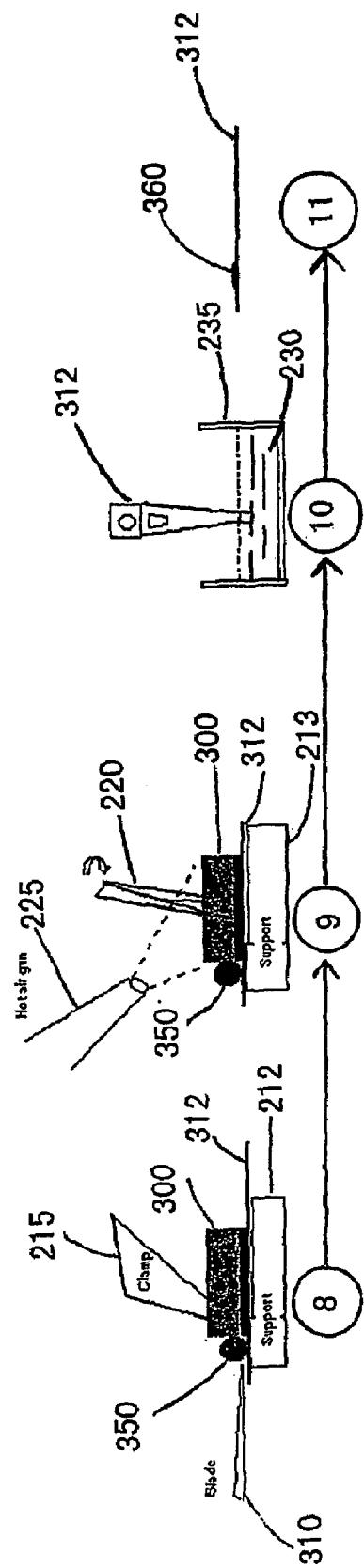
FIG. 3 is the second flow chart with descriptive drawings showing a second suspension salvage method implemented according to the principles of the present invention.

FIG. 3 is the second method implementing the principles of salvaging suspension. This flow applies to wireless HGA without conformal coating on gold ball area. At step 8, HGA with a damaged slider 300 is loaded onto cut gold ball fixture 210 and fixed with a clamp 215 to prevent HGA deformation while the gold balls 350 are being cut horizontally along the direction of suspension bonding pad to separate the electrical circuit connection between slider 300 and suspension 312. At step 9, the HGA is loaded onto a remove slider fixture 213, using a hot air gun 225 to heat slider area for a moment, to weaken the bonding strength of UV epoxy. A pair of metal tweezers 220 is used to clamp slider 300 and twists slightly in a horizontal direction to remove slider 300. At step 10, the HGA with the residue UV epoxy is put on immerse fixture 235 to immerse the tongue area of the HGA to into solvent 230 to dissolve UV epoxy. At step 11, the HGA is cleaned to remove the residue solvent on suspension. The appearance and performance of a salvaged suspension is almost identical to those of a regular suspension, except a residue gold layer 360 left behind by the gold ball 350 remains on the bonding pad of a salvaged suspension.

Figure 4:
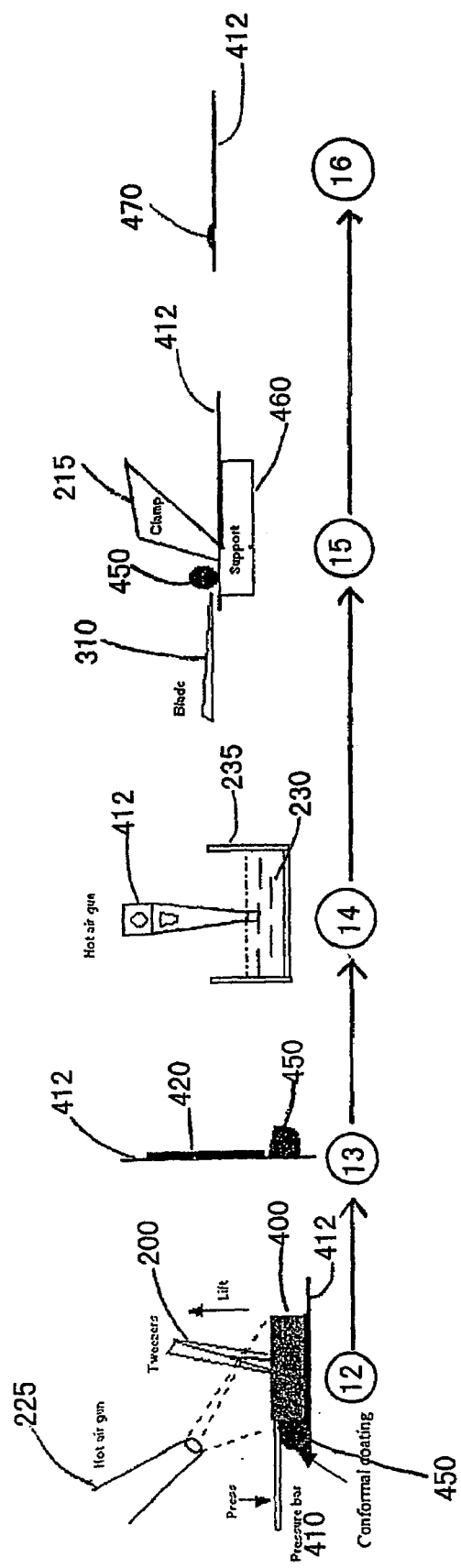
FIG. 4 is the third flow chart with descriptive drawings showing a third suspension salvage method implemented according to the principles of the present invention.

FIG. 4 is the third implementation of the suspension salvage principle. This method applies to wireless HGA with conformal coating on gold ball area. At step 12, a HGA with damaged slider 400 is loaded, and hot air gun 225 is applied to heat the slider area for a moment, weakening the bonding strength of UV epoxy. A pressure bar 410 is then used to press on the gold ball 450 (there may be more than one gold ball) with conformal coating, followed by motion of a pair of metal tweezers 220 to clamp slider 400 and to lift slider 400 up slowly. Pressure bar 410, in one implementation, is a thin metal plate of about 100 um in thickness, 700 um in width, and 10 cm in length. At step 13, after slider removal, the potting epoxy 420, gold ball 450 and conformal coating remain on suspension 412. At step 14, the HGA with the residue gold ball, UV epoxy is put on immerse fixture 235 to immerse the tongue area of the HGA into solvent 230 to dissolve UV epoxy. The HGA is cleaned to remove the residue solvent on suspension. At step 15, the suspension 412 which is being salvaged is loaded onto a cut ball fixture 460 and fixed with clamp 215 to ensure the HGA is not deformed while gold ball 450 is being cut by blade 310 along the direction of the suspension bonding. At step 16, the HGA has completed all salvage steps. The appearance and performance of salvaged suspension 412 is almost identical to that of a normal suspension, except for a residue gold layer 470 remaining on the bonding pad of the salvaged suspension 412.

In practicing the principles of this invention, appropriate fixtures may be used during the cutting process and removing process to ensure precise positioning and to avoid deformation. After cleaning the HGA, in one implementation, can be baked in a box oven commonly known in the art for approximately 30 minutes at 80 to 120 degrees Celsius.

The above embodiments of the invention are for illustrative purposes only. Many widely different embodiments of the present invention may be adopted without departing from the spirit and scope of the invention. Those skilled in the art will recognize that the method and structures of the present invention has many applications, and that the present invention is not limited to the specific embodiments described in the specification and should cover conventionally known variations and modifications to the system components described herein.

What is claimed is:

1. A method for preserving a suspension from a damaged head gimbal assembly, comprising the steps of:
   Cutting at least one gold ball along a direction parallel to a suspension bonding pad;
   Twisting off a slider from the head gimbal assembly; and
   Dissolving bonding epoxy.

2. The method of claim 1, wherein the dissolving step comprises blowing the suspension with a hot air gun.

3. The method of claim 1, wherein dissolving the bonding epoxy comprises immersing the suspension in acetone.

4. A method for preserving a suspension from a damaged head gimbal assembly, comprising the steps of:
   Pressing at least one gold ball mounted on the head gimbal assembly;
   Twisting off a slider from the head gimbal assembly; and
   Removing the at least one gold ball by horizontal cut by a blade.

5. The method of claim 4, further comprising prior to the pressing step heating the heat gimbal assembly with a hot air gun.

6. The method of claim 4, further comprising the step of dissolving bonding epoxy on a suspension of the head gimbal assembly by solvent before the removing step.

7. The method of claim 4, further comprising the step of loosening bonding epoxy by a hot air gun before the twisting step.

8. The method of claim 4, wherein the at least one gold ball has conformal coating in a surrounding area.

* * * * *